United States Patent [19]

Bharucha et al.

[11] 4,039,690

[45] Aug. 2, 1977

[54] CONTROL OF NITROSAMINE FORMATION IN NITRITE CURED MEAT BY USE OF AROMATIC PRIMARY AMINES

[75] Inventors: Kekhusroo R. Bharucha; Leon J. Rubin, both of Toronto; Charles K. Cross, Rexdale, all of Canada

[73] Assignee: Canada Packers Limited, Toronto, Canada

[21] Appl. No.: 619,067

[22] Filed: Oct. 2, 1975

[51] Int. Cl.² .......................... A23B 4/02; A23L 1/31
[52] U.S. Cl. .................................... 426/266; 426/281; 426/332; 426/641; 426/652
[58] Field of Search ............... 426/331, 601, 641, 645, 426/652, 654, 281, 265, 266, 332, 264; 260/571, 574, 578

[56] References Cited

U.S. PATENT DOCUMENTS

| 3,052,560 | 9/1962 | Delaney | 426/652 X |
|---|---|---|---|
| 3,154,421 | 10/1964 | Voegeli et al. | 426/652 X |
| 3,901,981 | 8/1975 | Draudt | 426/645 X |

FOREIGN PATENT DOCUMENTS

| 495,725 | 9/1953 | Canada | 426/654 |

OTHER PUBLICATIONS

WADC Report No. TR 53-353, pp. 30, 45, from CA:32:4251; CA 31:6858; CA 36:7282.

Primary Examiner—Raymond N. Jones
Assistant Examiner—Esther L. Massung
Attorney, Agent, or Firm—Bacon & Thomas

[57] ABSTRACT

The formation of nitrosamines in cooked, cured meat products is reduced or eliminated by using certain aromatic primary amines, such as p-alkoxyaminobenzenes, in the curing mixtures or to treat the cured meat.

20 Claims, 1 Drawing Figure

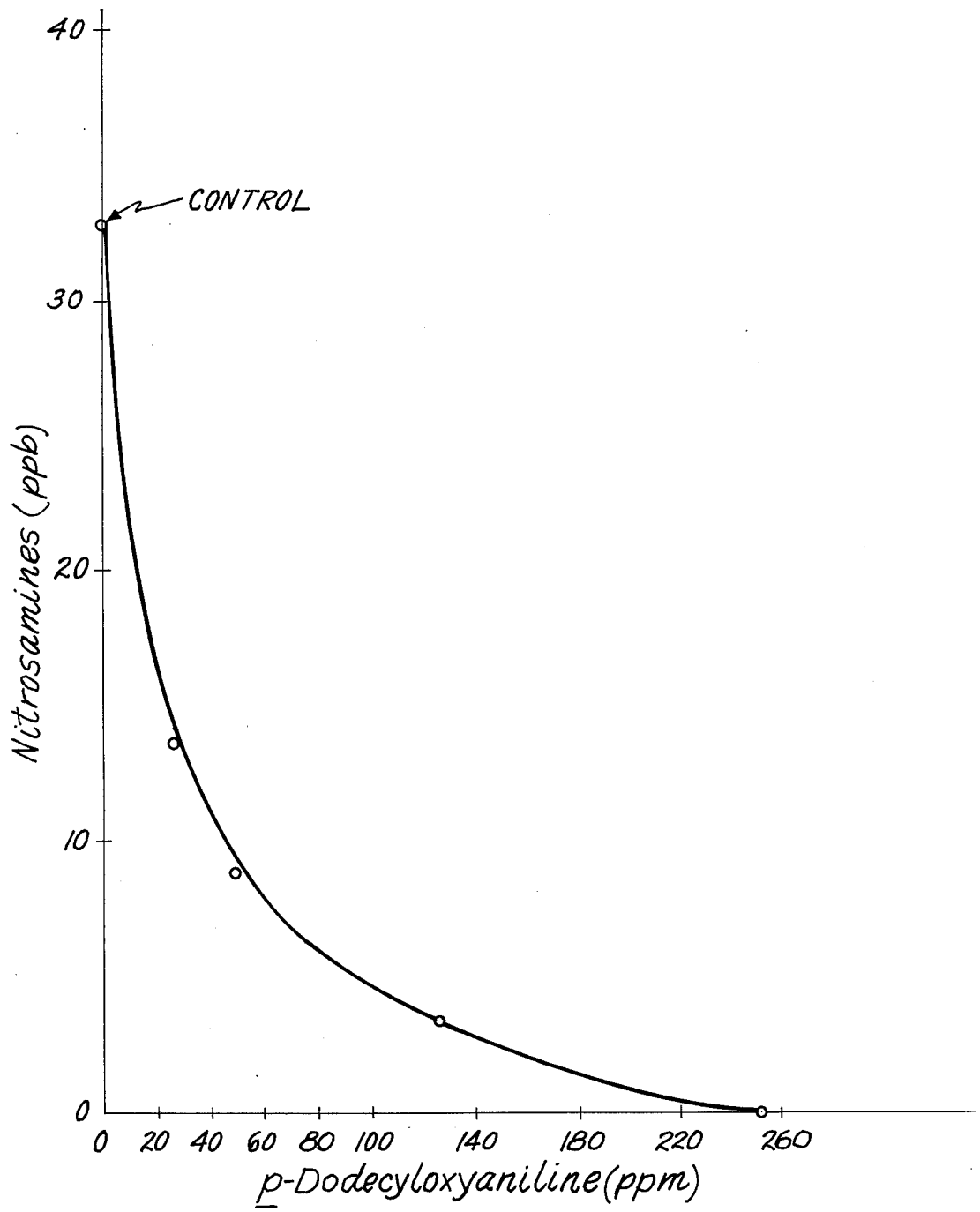
NITROSAMINE CONTENT OF COOK-OUT FAT VS. AMOUNT OF AROMATIC PRIMARY AMINE INCORPORATED IN CURED BACON

CONTROL OF NITROSAMINE FORMATION IN NITRITE CURED MEAT BY USE OF AROMATIC PRIMARY AMINES

CO-PENDING APPLICATIONS

This application is related to co-pending application Ser. No. 619,068 filed on even date by Kekhusroo R. Bharucha, Leon J. Rubin and Charles K. Cross.

BACKGROUND OF THE INVENTION

This invention relates to control of nitrosamine formation in nitrite cured meat.

Cured mean products have been prepared for many years by treatment of fresh meat with an alkali metal nitrite-containing composition or with a composition containing a mixture of alkali metal nitrite and an alkali metal nitrate. Sodium chloride is generally present in the curing mixture and other materials such as sugar may also be present. Spices may be added. Ascorbic acid, isoascorbic acid (sometime called erythorbic acid) or salts of ascorbic acid or isoascorbic acid are sometimes used to accelerate the formation of cured meat pigments.

The conventional alkali metal nitrite or nitrate-nitrite containing curing mixtures provide quite satisfactory cures insofar as cured-meat preservation, flavor, and development of the pink to red color characteristic of cured meats are concerned. Organic nitrites may be substituted for part or all of the alkali metal nitrite in these mixtures. Nitrates were at one time used alone and then one had to depend on bacterial action for their conversion to nitrites during curing process. No practical substitute for the nitrite ion in the curing process has yet been discovered.

Unfortunately, minute amounts of undesirable nitrosamines may occur in meats, particularly bacon, which have been cured with the conventional curing mixtures, and which have been cooked by methods in which the fats reach relatively high temperatures. For example, N-Nitrosopyrrolidine and dimethylnitrosamine are found on frying bacon, the cook-out fat containing the largest proportion of these nitrosamines with N-Nitrosopyrrolidine being present in the greater amount. These nitrosamines are not found in the cured raw meats. Apparently, the temperature attained by the fats in frying or equivalent cooking processes, such as broiling, grilling, microwave heating, etc., facilitates the reaction of alkali metal nitrites and amines of the meat to form nitrosamines. Since N-nitrosopyrrolidine and dimethylnitrosamine have been found to be carcinogenic in tests on experimental animals, they are regarded as a potential hazard in human food products. It is desirable, therefore, to reduce, eliminate or prevent the formation of these substances in cooked meat products. We have now discovered that a certain class of aromatic primary amines perform this function.

SUMMARY OF THE INVENTION

The present invention provides meat treating compositions and methods of treating nitrite cured meat which make use of a small quantity of an aromatic primary amine to reduce or eliminate the nitrosamines which are generated when nitrite cured meat is cooked at the usual high temperatures attained during frying, grilling or broiling. We have discovered that, when a small amount of certain aromatic primary amines are included in the curing mixtures or are otherwise applied to the meat before cooking, the amount of undesirable nitrosamines contained in the meat after cooking is drastically reduced and in some instances virtually eliminated.

It is therefore an object of the invention to provide meat treating compositions and methods which reduce or eliminate the formation of undesirable nitrosamines during subsequent cooking of the cured meat.

It is another object of the invention to provide a composition and method for curing bacon which reduces or eliminates the formation of undesirable nitrosamines in the bacon during the subsequent frying or equivalent cooking process.

A further object of the invention is to provide a nitrite cured meat product in which formation of undesirable nitrosamines during cooking is eliminated.

DETAILED DESCRIPTION

The aromatic primary amines which are suitable for practice of the invention include but are not necessarily limited to those defined by the following formula:

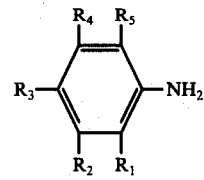

I wherein:
$R_1$, $R_2$, $R_3$, $R_4$ and $R_5$ are each selected from:
a. Hydrogen
b. A hydrocarbon radical of one to eighteen carbon atoms, such as alkyl, of either straight or branched chain, e.g. methyl, ethyl, propyl, butyl, 2,2-dimethylpropyl, hexyl, octyl, dodecyl, octadecyl, and the like; cycloalkyl, such as cyclohexyl; aryl, e.g. phenyl and naphthyl; alkaryl, e.g. tolyl and p-tert-butyl phenyl; or aralkyl, e.g. benzyl and phenethyl. The hydrocarbon radical may also be substituted with inert groups, such al alkoxy of 1 to 6 carbon atoms.
c. $-OR_6$ where $R_6$ is hydrogen or hydrocarbon as defined above,
or two adjacent members $R_1$, $R_2$, $R_3$, $R_4$ and $R_5$ are cyclized to form the $-(CH_2)_n-$ where n is 3 to 5.

Preferably, at least one of $R_1$, $R_2$, $R_3$, $R_4$ and $R_5$ is $-OR_6$, as defined above, and the remainder are hydrogen or substituents as defined above.

In the most preferred group of compounds, $R_3$, i.e. the position para to the amino group, is alkoxy. Preferably, also at least one of the ortho positions on the aromatic ring, e.g. $R_1$ or $R_5$, is left unsubstituted. With this preferred combination of substituents, the remainder of the aromatic nucleus may be substituted in almost any manner without destroying the activity of the compound for its intended purpose. Inert substituents, of course, increase the molecular weight and hence the activity of the compound on a weight basis may be correspondingly reduced.

The aromatic primary amines of the invention do not significantly affect the nitrosyl pigments of the cured meat, and so no not appreciably affect its color. Additionally, the aromatic primary amines do not materially change the nitrite content of the raw cured meat products, and thus do not impair its bacterial action. The mechanism by which the aromatic primary amines interfere with the formation of carcinogenic nitrosamines at high temperature is not completely understood. However, the invention is not limited by any particular theory of operation. It has been shown by a series of tests and analysis that up to 100% of the nitrosamines which normally appear in fried bacon have been eliminated.

PREPARATION OF COMPOUNDS

The compounds of the invention as defined by the structural formula above are either commercially available or are readily obtainable by any of a number of known chemical procedures. For example, o, m and p-methoxyanilines (Anisidines), o and p-ethoxyanilines (Phenetidines) and 4-methoxy-2-methylaniline are commercially available. Other compounds may be prepared by starting with primary aminobenzene (aniline), ortho-, meta- and para-aminophenols or with appropriate ortho-, meta- or para-nitrophenols, or with appropriately substituted derivatives thereof. The nitrophenols may be converted to the corresponding alkoxy nitro compounds, for example, by alkylation of the —OH group with alkyl iodide or bromide in the presence of anhydrous potassium carbonate in refluxing acetone. Primary amines may then be prepared by catalytic (palladium) reduction of the nitro group of the alkoxy nitro compound with hydrogen. Where intermediates are commercially available the corresponding preliminary steps may be omitted.

The starting aminophenols or nitrophenols may contain various substituents on other positions of the aromatic nucleus in accordance with the definitions of $R_1$, $R_2$, $R_3$, $R_4$ and $R_5$ given for formula I above.

Representative examples of preparation of the compounds are as follows:

EXAMPLE 1

Preparation of p-Dodecyloxyaniline a. p-Dodecyloxynitrobenzene p-Nitrophenol (49.7g, 0.30 mole), anhydrous potassium carbonate (48.3g, 0.35 mole), dodecyl iodide (89g, 0.30 mole), and dodecyl bromide (25g, 0.1 mole) were stirred at reflux in dry acetone (500 ml) for 44 hours. (Either dodecyl bromide or dodecyl iodide or a mixture may be used.) The reaction mixture was cooled and filtered. The cake was washed with acetone and the combined filtrate evaporated to dryness. The residue was taken up in ether and water. The ether layer was washed with water until the water wash was colourless. The ether layer was dried with anhydrous sodium sulphate and evaporated to dryness on a rotary evaporator to yield a pale-brown oil (120g) which solidified on standing. The mass was crystallized at −15° C. from hexane (300 ml) and methanol (2 ml). Filtration yielded pale yellow crystals of p-dodecyloxynitrobenzene (95.3g, 89%), m.p. 51.5°–53° C..

b. Reduction of p-dodecyloxynitrobenzene to p-dodecyloxyaniline

The nitro compound (6g) was dissolved in absolute ethanol (200 ml) in a 500 ml Parr bottle. Palladium on charcoal (10%, 450 mg) was added and the mixture hydrogenated at 50 psi at room temperature. Hydrogen take-up was very rapid and was apparently finished in 50 minutes. The catalyst was removed by filtration three times through double Whatman No. 1 paper under vacuum. The colourless ethanol filtrate was evaporated on a rotary evaporator using a 35° C. water bath.

The residue was dried at room temperature in high vacuum for one hour. Yield was 5.26g (97%) of p-dodecyloxyaniline in the form of a creamy solid; m.p. 55°–56° C. with prior sintering at 51° C.

Other alkoxyanilines may be prepared in like manner by use of appropriate alkyl halides.

EXAMPLES 2–12

By procedures similar to that of Example 1, the following additional compounds were prepared:

2. o-Methoxyaniline from o-nitrophenol and methyl halide followed by catalytic reduction.
3. o-Ethoxyaniline from o-nitrophenol and ethyl halide followed by catalytic reduction.
4. p-Propyloxyaniline from p-nitrophenol and propyl halide followed by catalytic reduction.
5. p-n-Butyloxyaniline from p-nitrophenol and n-butyl halide followed by catalytic reduction.
6. o-n-Butyloxyaniline from o-nitrophenol and n-butyl halide followed by catalytic reduction.
7. P-Heptyloxyaniline from p-nitrophenol and heptyl halide followed by catalytic reduction.
8. p-Phenoxyaniline by catalytic reduction of p-phenoxynitrobenzene.
9. o-Phenoxyaniline by catalytic reduction of o-phenoxynitrobenzene.
10. p-sec.-Butoxyaniline by catalytic (pd/C) reduction of p-sec.-butoxynitrobenzene.
11. m-Methoxyaniline by catalytic (pd/C) reduction of m-methoxynitrobenzene.
12. o,p-Dimethoxyaniline by catalytic reduction of 4-nitroresorcinol dimethyl ether.

COMPOSITIONS AND METHODS OF APPLICATION

In one embodiment of the invention, the aromatic primary amines are introduced into the meat with the conventional curing solution and one aspect of the invention therefore relates to curing solutions containing a minor amount of primary amine effective to reduce or eliminate the nitrosamine content of the cured, cooked meat. Emulsifying agents may be used to facilitate dispersion of the aromatic primary amine component in the curing solution.

The curing agents and amine are dissolved or dispersed in water to form a so-called "pickle" solution in which the meats are soaked or which is injected into the meats. A combination of these procedures can be used. Thus, the meat can be soaked in the pickle solution for a sufficient time to permit diffusion of the solution throughout the meat. Alternatively, the pickle solution can be pumped through the vascular system of the meat cut or injected directly into the muscle by use of a plurality of needles. After pumping or injection, the meat cut may be given a soaking period in the pickle solution. In the case of bacon, the amount of pickle solution incorporated in the meat may be in the order of about 10%, and in the case of hams may be about 18%. However, these amounts are subject to wide variations at the choice of the processor.

The quantities of the various ingredients in the pickle solution can be varied widely depending on the meat to be cured and the type of cure. Typically, the curing solution may contain, on a weight basis, from about 5 to 25% NaCl, from about 4 to 12% of sugars, e.g., sucrose and dextrose, from about 0.1 to 4% ascorbate or isoascorbate, from about 0.001 to 1.0% aromatic primary amine, from about 0.01 to 1.0% emulsifying agent and the remainder, water.

It has been found that amounts of aromatic primary amine in the order of about 1 to 1000 ppm by weight, based on the weight of the cured meat, incorporated in the meat either with the curing solution or after the meat has been cured will effectively reduce or eliminate the nitrosamines that are usually formed when nitrite-cured meat is fried or otherwise cooked at high temperature. With the preferred aromatic primary amines, having an alkoxy substituent para to the primary amino group, quantities in the meat in the range of about 100 to 250 ppm, based on the weight of cured meat will virtually eliminate nitrosamines in fried bacon. Since the activity of the aromatic primary amine on a weight basis will vary somewhat depending upon the size of the molecule, the quantity may best be expressed in terms of moles. On this basis, the effective range may run from about 0.05 to 4.0 millimoles of aromatic primary amine per kilogram of cured meat, with a preferred range being about 0.1 to 2.0 millimoles per kilogram of meat. The quantity of aromatic primary amine in the meat is quite low but nevertheless is effective to materially reduce or eliminate the known carcinogenic nitrosamines of cooked, cured meat products. The meat itself enjoys all of the advantages of the nitrite cure with respect to cure and protection against bacterial action.

For preparation of curing solutions any suitable edible emulsifying agent that will facilitate the dispersion of the primary amines in water may be used. Representative examples of emulsifying agents are the polyoxyalkylene derivatives of hexitol anhydride partial long chain fatty acid esters, known under the "Tween" trademark. However, the invention is not limited to the use of these representative substances.

In the processing of bacon, hams and the like, after incorporation of the pickle solution, the meat may be subjected to a conventional heating and/or smoking step. Typically, bacon is heated in this step to an internal temperature of about 55° C. and larger cuts such as hams to an internal temperature of about 67° C..

In another embodiment of the invention, a solution or dispersion of the aromatic primary amines may be applied to the meat after curing, e.g. a solution of the selected aromatic primary amine in a suitable liquid solvent medium may be sprayed or brushed on slices of the cured meat prior to packaging. Another aspect of the invention therefore relates to a composition for application to cured meat surfaces comprising a solution or dispersion of an aromatic primary amine, of the class described, in a suitable liquid solvent medium which is applicable to meat. Suitable liquids include edible oils as well as vaporizable solvents such as the lower aliphatic alcohols, e.g. ethanol and isopropanol. In general, concentrations of about 1 to 10% of the amine in the liquid medium are used. These compositions are applied to the meat surfaces in amounts to provide from about 1 to 1000 ppm based on the weight of the cured meat or, as before stated with respect to application with the curing solution, from about 0.05 to 4.0 millimoles of aromatic primary amine per kilogram of cured meat, with a preferred range of about 0.1 to 2.0 millimoles per kilogram of cured meat.

DESCRIPTION OF DRAWING

Reference is made to the drawing which graphically illustrates the dramatic reduction in nitrosamine content of the cook-out fat from fired bacon which was prepared from slices which had been treated with an oil solution of a representative compound of the invention so as to provide varying levels of the compound in the meat.

EXAMPLES OF PRACTICE

The invention will be further illustrated by the following examples of meat-curing compositions and their use.

EXAMPLE 13

A conventional meat curing solution is prepared by mixing (on a weight basis) 58.4 parts of NaCl, 21.2 parts of sucrose, 5.2 parts of dextrose and 0.66 parts of sodium nitrite with 308 parts of water. To 100 parts of this curing solution 0.2 parts by weight of the selected aromatic primary amine is added and is thoroughly dispersed therein with the aid of 0.4 parts by weight of Tween 60. This solution is then injected into bacon bellies in an amount of about 100 grams of curing solution per kilogram of meat thereby providing a level of about 200 mg/kilogram (200 ppm) of the aromatic primary amine in the meat. The bacon is then smoked, cooled, sliced and packaged in the usual manner. After frying it will be found that virtually no detectable amount of nitrosamines will be present.

It will be understood that the levels of aromatic primary amine incorporated in the curing solution can be varied widely within the limits previously set forth.

In order to further demonstrate the utility of compounds within the scope of Formula I above for reduction of nitrosamines in fried cured meats and to illustrate the alternative mode of application the following procedure was employed: Representative aromatic primary amines, as listed in Tables I and II below, were dissolved in winterized soya oil (4.5% concentration) and the resulting solution was streaked on bacon slices, which had undergone the conventional nitrite cure and plant processing, in a quantity providing a level of 100 ppm of the aromatic primary amine in most instances. In the case of p-dodecyloxyaniline additional samples were tested at levels from 25 ppm to 250 ppm to demonstrate the range of effectiveness of the compounds. The controls were streaked with oil alone. The bacon slices were fried under standarized conditions and the cook-out fat was analyzed for nitrosamine content.

EXAMPLES 14–29

The following examples, as shown in Table I below, illustrate the effect of various aromatic primary amines at the 100 ppm level on development of nitrosamines during frying of bacon slices.

TABLE I

| | AROMATIC PRIMARY AMINES (100 PPM)* | | | NITROSAMINES | |
|---|---|---|---|---|---|
| Example | Substance | Mol. Wt. | mMoles in Kg of Bacon | Test (ppb)** | Control (ppb)** |
| 14 | p-Aminophenol | 109 | 0.9174 | 13.0 | 81.0 |
| 15 | p-Methoxyaniline | 123 | 0.8130 | 5.8 | 81.0 |
| 16 | p-Ethoxyaniline | 137 | 0.7299 | 4.1 | 81.0 |

TABLE I-continued
AROMATIC PRIMARY AMINES (100 PPM)*

| Example | Substance | Mol. Wt. | mMoles in Kg of Bacon | NITROSAMINES Test (ppb)** | Control (ppb)** |
|---|---|---|---|---|---|
| 17 | p-Propyloxyaniline | 151 | 0.6622 | 4.7 | 97.0 |
| 18 | p-n-Butyloxyaniline | 165 | 0.6060 | 7.3 | 97.0 |
| 19 | p-Hexyloxyaniline | 193 | 0.5181 | 4.1 | 42.5 |
| 20 | p-Heptyloxyaniline | 207 | 0.4830 | 6.9 | 50.0 |
| 21 | p-Dodecyloxyaniline | 277 | 0.3610 | 9.4 | 50.0 |
| 22 | p-Phenoxyaniline | 185 | 0.5405 | 10.6 | 42.5 |
| 23 | o-Phenoxyaniline | 185 | 0.5405 | 23.0 | 42.5 |
| 24 | o-Methoxyaniline | 123 | 0.8130 | 20.0 | 41.0 |
| 25 | o-Ethoxyaniline | 137 | 0.7299 | 16.0 | 41.0 |
| 26 | o-n-Butoxyaniline | 165 | 0.6060 | 15.0 | 41.0 |
| 27 | p-Methoxy-2-Methylaniline | 137 | 0.7299 | 1.9*** | 17.5 |
| 28 | p-Sec. butoxyaniline | 165 | 0.6060 | 1.3*** | 17.5 |
| 29 | m-Methoxyaniline | 123 | 0.8130 | 5.3 | 17.5 |
| 30 | o,p-Dimethoxyaniline | 153 | 0.6536 | 2.5*** | 23.0 |

*PPM = parts per million
**ppb = parts per billion
***Figures below about 3 ppb are below accurate detection level of analytical procedure used.

It will be seen from the foregoing table that all of the aromatic primary amines tested provided effective reduction of nitrosamines at the 100 ppm level in comparison with the controls. The preferred p-alkoxy substituted compounds were more effective at this level than the corresponding ortho- and meta- substituted compounds. Compare Examples 15, 24 and 29 for para-, ortho- and meta-methoxy substituted anilines. Substantially no difference was observed between compounds having straight chain and branched chain alkoxy substituents.

EXAMPLE 31

The effect of application of the aromatic primary amines to the cured bacon slices at different levels is illustrated by the following table wherein the results of such determination with p-dodecyloxyaniline as the representative amine are shown:

TABLE II
COMPARISON OF DIFFERENT LEVELS of p-DODECYLOXYANILINE in BACON

| mol. Wt. | mMoles in Kg of Bacon | ppm | NITROSAMINES Test (ppb) | Control (ppb) |
|---|---|---|---|---|
| 277 | 0.090 | 25.0 | 13.7 | 33 |
|  | 0.181 | 50.0 | 8.8 | 33 |
|  | 0.361 | 100.0 | 9.4 | 50 |
|  | 0.451 | 125.0 | 3.5 | 33 |
|  | 0.902 | 250.0 | 0.0 | 33 |

Since the analytical means available for testing presence of nitrosamines are not accurate below about 3 parts per billion, it will be seen that 125 ppm (0.451 m moles) of p-dodecyloxyaniline incorporated in the cured bacon resulted in reduction of nitrosamines to the barely detectable level. There was substantial reduction in development of nitrosamines at all levels tested.

This invention can also be applied to the reduction of nitrosamines in cooked nitrite-cured chopped meat products as well as any other nitrite cured meat products wich may be subjected to cooking temperatures encountered in frying, grilling or broiling.

The embodiments of the invention is which an exclusive property or privilege is claimed are defined as follows:

1. A meat treating composition comprising a solution or dispersion of an aromatic primary amine in a nitrite-containing meat curing solution, said aromatic primary amine having the formula:

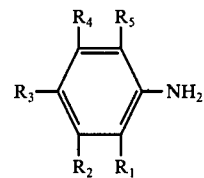

wherein
R$_1$, R$_2$, R$_3$, R$_4$ and R$_5$ are each selected from:
a. hydrogen,
b. hydrocarbon of one to eighteen carbon atoms,
c. —OR$_6$ where R$_6$ is hydrogen or hydrocarbon as defined above,
or two adjacent members R$_1$, R$_2$, R$_3$, R$_4$ and R$_5$ are cyclized to form the group (CH$_2$)$_n$ where n is 3 to 5, and said aromatic primary amine being effective to reduce the nitrosamine content of nitrite cured meat treated by said composition when cooked at frying temperature.

2. The meat treating composition of claim 1 wherein R$_3$ is alkoxy.

3. The meat treating composition of claim 1 wherein R$_3$ is alkoxy and R$_1$, R$_2$, R$_4$ and R$_5$ are hydrogen.

4. The meat treating composition of claim 1 wherein the meat curing solution is an aqueous brine solution and the aromatic primary amine is dispersed in said solution with the aid of an edible emulsifying agent.

5. The meat curing composition of claim 4 wherein the aromatic primary amine is present in the solution in an amount of about 0.001 to 1.0% based on the weight of the solution.

6. A composition for the curing of meats comprising an aqueous curing solution containing sodium chloride, a sugar, an alkali metal nitrite curing salt and from about 0.001 to 1.0% of a p-alkoxyaniline compound wherein the alkoxy group contains from 1 to 18 carbon atoms.

7. A process for nitrosamine control in nitrite cured meats comprising treating the meat during or after the nitrite cure with an amount of an aromatic primary amine effective to reduce the quantity of nitrosamines formed when the cured meat is cooked at frying temperature, said aromatic primary amine having the formula:

-continued

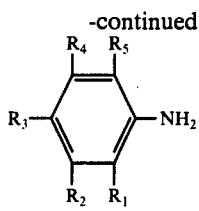

wherein:

$R_1$, $R_2$, $R_3$, $R_4$ and $R_5$ are each selected from:
a. hydrogen,
b. Hydrocarbon of one to eighteen carbon atoms
c. —$OR_6$ where $R_6$ is hydrogen, hydrocarbon as defined above, or two adjacent members $R_1$, $R_2$, $R_3$, $R_4$ and $R_5$ are cyclized to form the group $(CH_2)_n$ where $n$ is 3 to 5.

8. The process of claim 7 wherein the aromatic primary amine is applied to the meat in an amount such that the cured meat contains from about 0.05 to 4.0 millimoles per kilogram of meat.

9. The process of claim 7 wherein the aromatic primary amine is applied to the meat in an amount such that the cured meat contains from about 0.1 to 2.0 millimoles per kilogram of meat.

10. The process of claim 7 wherein the aromatic primary amine is dispersed in the nitrite curing solution and the solution is injected into the meat.

11. The process of claim 7 wherein the aromatic primary amine is dissolved in an edible oil and the oil solution is applied to surfaces of sliced cured meat.

12. The process of claim 7 wherein the meat is a pork cut for production of bacon.

13. The process of claim 11 wherein the meat is sliced bacon.

14. A process for the curing of bacon so as to reduce the quantity of nitrosamines formed when the cured bacon is subjected to frying temperatures, comprising curing said bacon with a nitrite curing solution containing an amount of a p-alkoxyaniline compound sufficient to provide from about 0.1 to 2.0 millimoles per kilogram of meat, the alkoxy group of said compound containing from 1–18 carbon atoms.

15. The process of claim 14 wherein the curing solution contains alkali metal nitrite, sodium chloride and a sugar dissolved therein and the p-alkoxyaniline compound is dispersed in said solution with an edible emulsifier.

16. The process of claim 14 wherein the curing solution is injected into the meat.

17. A process for the control of nitrosamine formation during cooking of nitrite cured bacon comprising applying to slices of the cured bacon an edible oil solution of a p-alkoxy aniline compound, said solution being applied to the bacon slices in an amount sufficient to provide from about 0.1 to 2.0 millimoles of the said compound per kilogram of bacon.

18. A nitrite cured meat product containing from about 0.05 to 4.0 millimoles per kilogram of a compound of the formula:

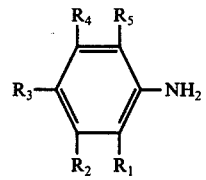

I wherein:
$R_1$, $R_2$, $R_3$, $R_4$ and $R_5$ are each selected from:
a. hydrogen,
b. Hydrocarbon of one to eighteen carbon atoms
c. —$OR_6$ where $R_6$ is hydrogen, hydrocarbon as defined above, or two adjacent members $R_1$, $R_2$, $R_3$, $R_4$ and $R_5$ are cyclized to form the group $(CH_2)_n$ where n is 3 to 5.

19. The product of claim 18 wherein the nitrite cured meat is bacon.

20. The product of claim 19 wherein the compound is a p-alkoxyaniline and is present in the bacon in an amount of about 0.1 to 2.0 millimoles per kilogram.

* * * * *